(12) United States Patent
Chu et al.

(10) Patent No.: US 12,530,464 B2
(45) Date of Patent: Jan. 20, 2026

(54) SECURE BOOTING SYSTEM AND OPERATION METHOD THEREOF

(71) Applicant: SAMSUNG ELECTRONICS CO., LTD., Suwon-si (KR)

(72) Inventors: Younsung Chu, Suwon-si (KR); Jisoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 203 days.

(21) Appl. No.: 18/205,866

(22) Filed: Jun. 5, 2023

(65) Prior Publication Data

US 2024/0078316 A1 Mar. 7, 2024

(30) Foreign Application Priority Data

Sep. 7, 2022 (KR) .................. 10-2022-0113807

(51) Int. Cl.
 *G06F 21/57* (2013.01)
 *G06F 21/60* (2013.01)

(52) U.S. Cl.
 CPC .......... *G06F 21/575* (2013.01); *G06F 21/602* (2013.01)

(58) Field of Classification Search
 CPC ....... G06F 21/57; G06F 21/575; G06F 21/602
 See application file for complete search history.

(56) References Cited

U.S. PATENT DOCUMENTS

| | | | |
|---|---|---|---|
| 9,223,982 B2 | 12/2015 | Adams et al. | |
| 9,727,732 B2 | 8/2017 | Jang et al. | |
| 10,032,030 B2 | 7/2018 | Li et al. | |
| 11,336,444 B2 | 5/2022 | Jeon et al. | |
| 2008/0163209 A1* | 7/2008 | Rozas | G06F 9/45558 718/1 |
| 2014/0250291 A1 | 9/2014 | Adams et al. | |
| 2015/0052342 A1 | 2/2015 | Jang et al. | |
| 2015/0113278 A1* | 4/2015 | Cocchi | H04L 63/0853 713/171 |
| 2017/0011219 A1 | 1/2017 | Li et al. | |
| 2017/0180314 A1* | 6/2017 | Walker | H04L 9/3263 |
| 2019/0213359 A1* | 7/2019 | Kepa | G06F 21/73 |
| 2020/0082091 A1* | 3/2020 | Areno | G06F 9/45558 |

(Continued)

FOREIGN PATENT DOCUMENTS

GB  2588647 A  *  5/2021  ............. G06F 21/44

*Primary Examiner* — Jaweed A Abbaszadeh
*Assistant Examiner* — Cheri L Harrington
(74) *Attorney, Agent, or Firm* — Sughrue Mion, PLLC

(57) ABSTRACT

An electronic device includes at least one processor, a first storage unit configured to store a secret value set by a host, a second storage unit configured to store a boot loader code, a first firmware code, and a second firmware code, and a read-only memory (ROM) configured to store a ROM code executable in a booting operation. The ROM code, when executed, may cause the at least one processor to generate a first booting value based on the secret value and a first hash value for the boot loader code, the boot loader code, when executed, may cause the at least one processor to generate a second booting value based on the first booting value and a second hash value for the first firmware code, and the first firmware code, when executed, may cause the at least one processor to generate a third booting value based on the second booting value and a third hash value for the second firmware code.

20 Claims, 15 Drawing Sheets

(56) References Cited

U.S. PATENT DOCUMENTS

| | | |
|---|---|---|
| 2021/0058249 A1 | 2/2021 | Jeon et al. |
| 2022/0067164 A1 | 3/2022 | Liu |
| 2022/0108018 A1* | 4/2022 | Osorio Lozano ..... H04L 9/0897 |
| 2022/0129559 A1 | 4/2022 | Duval |
| 2022/0198018 A1* | 6/2022 | Wentz ................... H04L 9/3268 |
| 2023/0073884 A1* | 3/2023 | Farrell .................... G06F 21/54 |

* cited by examiner

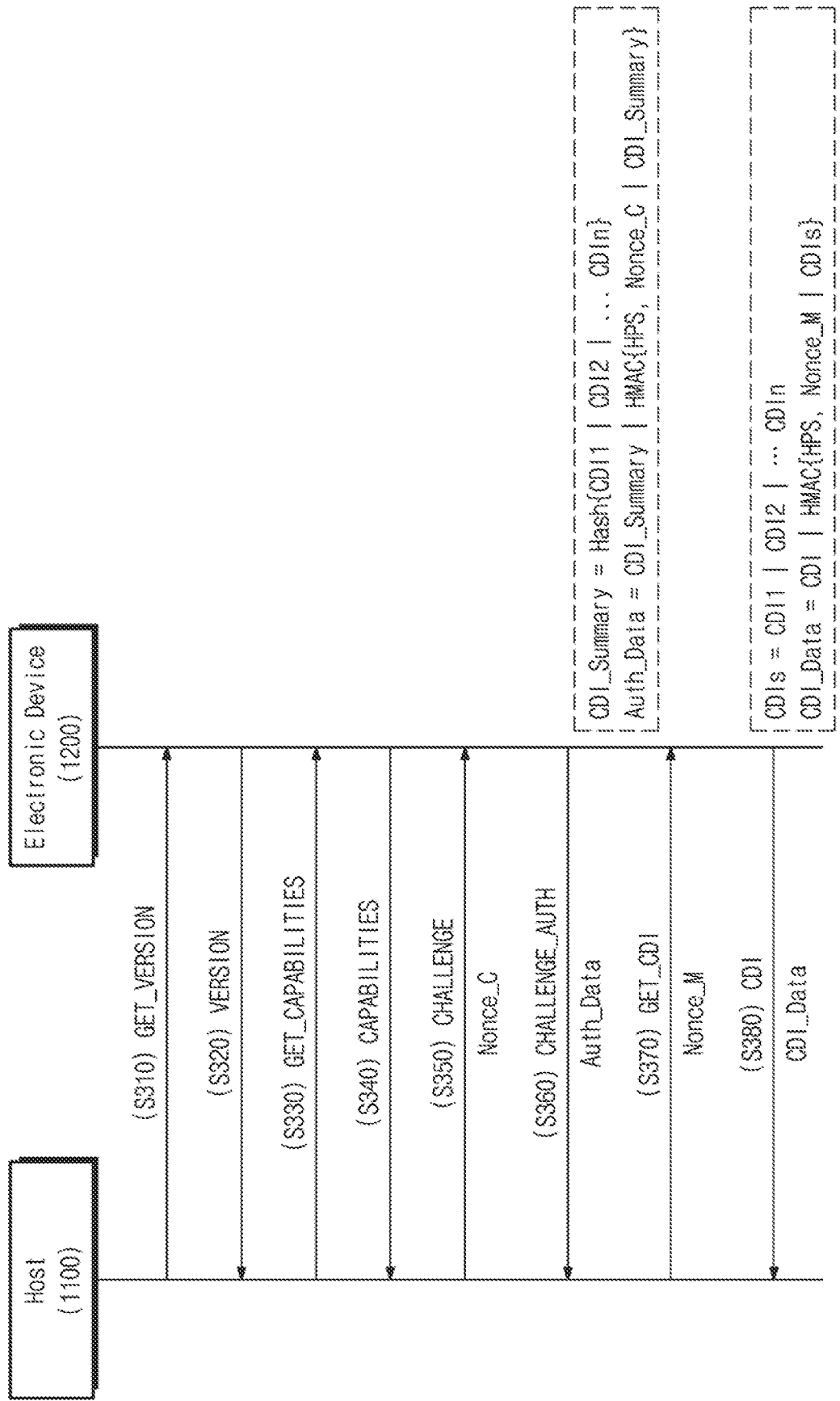

SECURE BOOTING SYSTEM AND OPERATION METHOD THEREOF

CROSS-REFERENCE TO RELATED APPLICATIONS

This application is based on and claims priority under 35 U.S.C. § 119 to Korean Patent Application No. 10-2022-0113807 filed on Sep. 7, 2022, in the Korean Intellectual Property Office, the disclosure of which is incorporated by reference herein in its entirety.

BACKGROUND

1. Field

One or more example embodiments of the present disclosure relate to a secure booting system and an operation method of the secure booting system.

2. Description of Related Art

In related art, an electronic device may perform a verification operation on a boot loader or firmware when performing a booting operation, and may further load and execute the boot loader or firmware when the verification operation succeeds. For example, a read only memory (ROM) code stored in a ROM may be executed to verify a digital signature included in the boot loader using a public key stored in the ROM before the execution of the boot loader. When the verification operation succeeds, the boot loader may be loaded and executed. A boot loader code stored in the boot loader may be executed to verify a digital signature included in the firmware using the public key stored in the boot loader before the execution of the firmware. When the verification operation succeeds, the firmware may be loaded and executed. The above booting operation may be referred to as "public key-based secure booting".

Because the public key-based secure booting requires a long processing time for verifying the digital signature in the booting operation, a hardware accelerator for accelerating the algorithm may be provided. However, among electronic devices, devices such as embedded MultiMediaCard (eMMC) and universal flash storage (UFS) are difficult to include with the hardware accelerator due to size and cost. Accordingly, there is a need for a technology capable of quickly performing the secure booting operation without a hardware accelerator.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

Provided are a secure booting method and a secure booting system capable of quickly performing a secure booting operation without including a hardware accelerator.

Additional aspects will be set forth in part in the description which follows and, in part, will be apparent from the description, or may be learned by practice of the presented embodiments.

According to an aspect of an example embodiment, a booting system may include a host, and an electronic device configured to perform a booting operation based on a secret value set by the host, the electronic device including at least one processor, a first storage unit configured to store the secret value set by the host, a second storage unit configured to store a boot loader code, a first firmware code, and a second firmware code, and a read-only memory (ROM) configured to store a ROM code executable in the booting operation. The ROM code, when executed, may cause the at least one processor to generate a first booting value based on the secret value and a first hash value for the boot loader code, the boot loader code, when executed, may cause the at least one processor to generate a second booting value based on the first booting value and a second hash value for the first firmware code, the first firmware code, when executed, may cause the at least one processor to generate a third booting value based on the second booting value and a third hash value for the second firmware code, and the electronic device may be configured to determine whether booting succeeds by sending at least one of the first booting value, the second booting value, and the third booting value to the host.

According to an aspect of an example embodiment, an electronic device may include at least one processor, a first storage unit configured to store a secret value set by a host, a second storage unit configured to store a boot loader code, a first firmware code, and a second firmware code, and a ROM configured to store a ROM code executable in a booting operation. The ROM code, when executed, may cause the at least one processor to generate a first booting value based on the secret value and a first hash value for the boot loader code, the boot loader code, when executed, may cause the at least one processor to generate a second booting value based on the first booting value and a second hash value for the first firmware code, and the first firmware code, when executed, may cause the at least one processor to generate a third booting value based on the second booting value and a third hash value for the second firmware code.

According to an aspect of an example embodiment, a booting method may include generating, by executing a ROM code with at least one processor, a first hash value for a boot loader code, generating, by executing the ROM code with the at least one processor, a first booting value using the first hash value and a preset secret value, generating, by executing the boot loader code with the at least one processor, a second hash value for a first firmware code, generating, by executing the boot loader code with the at least one processor, a second booting value using the second hash value and the first booting value, generating, by executing the first firmware code with the at least one processor, a third hash value for a second firmware code, generating, by executing the first firmware code with the at least one processor, a third booting value using the third hash value and the second booting value, and determining whether booting succeeds by sending at least one of the first booting value, the second booting value, and the third booting value to a host.

BRIEF DESCRIPTION OF DRAWINGS

The above and other aspects, features, and advantages of certain example embodiments of the present disclosure will be more apparent from the following description taken in conjunction with the accompanying drawings, in which:

FIG. 9A is a flowchart illustrating an example of a protocol that allows an electronic device to report a booting result to a host according to an embodiment of the present disclosure;

DETAILED DESCRIPTION

Figure 1:
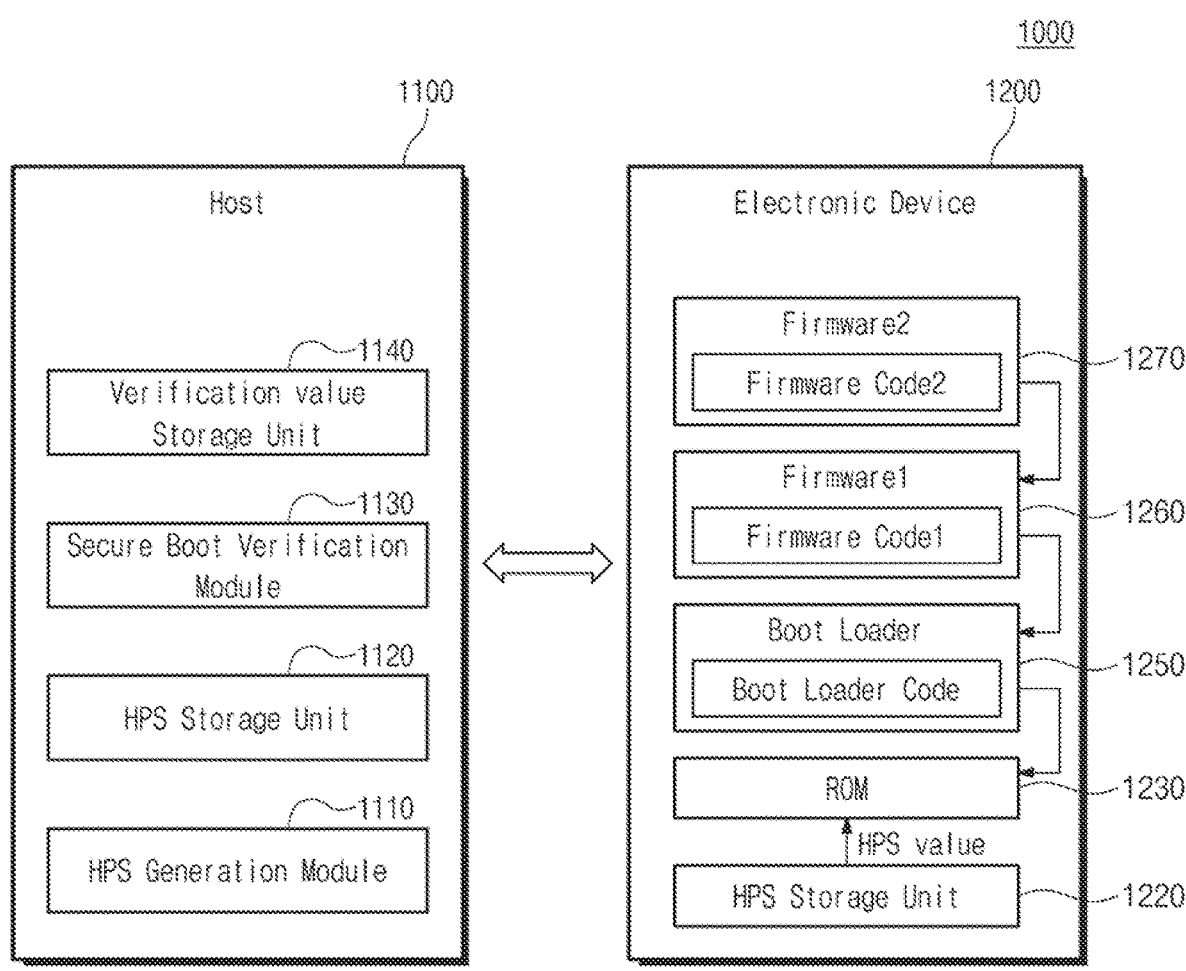
FIG. 1 is a diagram illustrating a secure booting system according to an embodiment of the present disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a diagram illustrating a secure booting system 1000 according to an embodiment of the present disclosure. Referring to FIG. 1, the secure booting system 1000 may include a host 1100 and an electronic device 1200.

The host 1100 and the electronic device 1200 may share a host pre-installed secret (HPS) value. For example, the host 1100 may generate the HPS value and may provide the generated HPS value to the electronic device 1200. The HPS value that the host 1100 and the electronic device 1200 share may be used in the secure booting operation of the secure booting system 1000. The secure booting operation may refer to a booting operation to determine whether the boot loader code or firmware code of the electronic device 1200 is falsified and to stop or cure the execution of the boot loader code or firmware code when it is determined that the boot loader code or firmware code is abnormal. For example, the electronic device 1200 may generate a booting value using the HPS value, and the host 1100 may determine whether the boot loader code or firmware code is falsified, by comparing the booting value received from the electronic device 1200 with a verification value that is based on the HPS value.

The host 1100 may include an HPS generation module 1110, an HPS storage unit 1120, a secure booting verification module 1130, and a verification value storage unit 1140.

The HPS generation module 1110 may generate the HPS value. For example, the HPS generation module 1110 may generate an arbitrary HPS value and may encrypt the generated HPS value so as to be provided to the electronic device 1200. For example, the HPS generation module 1110 may encrypt the HPS value based on a Rivest-Samir-Adleman (RSA) algorithm. In this case, a provisioning key that is stored in advance in the process of manufacturing the electronic device 1200 may be provided as a key of the RSA algorithm. The HPS value may be variously referred to as a secret value, a unique value, a device unique value, and a unique key.

The HPS storage unit 1120 may store the HPS value. The HPS storage unit 1120 may be implemented with a one-time password (OTP) memory or an electronic fuse (E-fuse) memory for the purpose of safely retaining the HPS value. However, the present disclosure is not limited thereto. For example, the HPS storage unit 1120 may be implemented with a mask read-only memory (ROM), a programmable read-only memory (PROM), an erasable programmable read-only memory (EPROM), an electrically erasable programmable read-only memory (EEPROM), or a flash memory.

The secure booting verification module 1130 may receive the booting value from the electronic device 1200. Herein, the booting value may include a device identifier value (e.g., a compound device identifier (CDI)) or a measurement value received from the electronic device 1200. For example, the device identifier value CDI or the measurement value may be generated based on the HPS value.

The secure booting verification module 1130 may receive the verification value. The verification value may be received from an external firmware release server or may include an endorsement value or a hash value generated by the host 1100. For example, the endorsement value or the hash value may be generated based on the HPS value.

The secure booting verification module 1130 may determine whether the boot loader code or the firmware code of the electronic device 1200 is falsified, based on the booting value and the verification value. When the boot loader code or the firmware code of the electronic device 1200 is falsified, the device identifier value CDI or the measurement value is not normally generated. Accordingly, the secure booting verification module 1130 may determine whether the boot loader code or the firmware code is falsified, by comparing the booting value and the verification value.

The verification value storage unit 1140 may store the verification value that is used to determine whether the boot loader code or the firmware code is falsified. For example, the verification value storage unit 1140 may receive and store the endorsement value or the hash value from the external firmware release server. Alternatively, the verification value storage unit 1140 may store the endorsement value or the hash value generated by the host 1100. In an embodiment, the verification value storage unit 1140 may also be implemented with an OTP memory, a mask ROM, a PROM, an EPROM, an EEPROM, or a flash memory. In an embodiment, the verification value storage unit 1140 may be implemented with one storage unit together with the HPS storage unit 1120.

When booted up, the electronic device 1200 may generate the booting value for the booting operation and may provide the generated booting value to the host 1100. The electronic device 1200 may include an HPS storage unit 1220, a ROM 1230, a boot loader 1250, first firmware 1260, and second firmware 1270.

The HPS storage unit 1220 may store the HPS value that is identical to the HPS value stored in the host 1100. The HPS storage unit 1220 may be implemented with an OTP memory or an E-fuse circuit, but the present disclosure is not limited thereto. For example, the HPS storage unit 1220 may also be implemented with a mask ROM, a PROM, an EPROM, an EEPROM, or a flash memory.

The ROM 1230 may store a ROM code that is first executed when a power is supplied to the electronic device 1200. The ROM code may receive the HPS value from the HPS storage unit 1220 and may receive the boot loader code from the boot loader 1250. The ROM code may generate a first device identifier value based on the HPS value and the boot loader code.

The boot loader 1250 may include the boot loader code. The boot loader code may receive the first device identifier value from the ROM 1230 and may receive a first firmware code from the first firmware 1260. The boot loader code may generate a second device identifier value based on the first device identifier value and the first firmware code.

The first firmware 1260 may include the first firmware code. The first firmware code may receive the second device identifier value from the boot loader 1250 and may receive a second firmware code from the second firmware 1270. The first firmware code may generate a third device identifier value based on the second device identifier value and the second firmware code.

According to an embodiment of the present disclosure, the electronic device 1200 may provide the host 1100 with at least one of the first to third device identifier values as the booting value. The host 1100 may determine whether the boot loader code, the first firmware code, and/or the second firmware code is falsified, by comparing the booting value and the verification value.

The first device identifier value may be generated based on the boot loader code. As such, when the boot loader code is falsified, the first device identifier value may not be normally generated. Accordingly, when the first device identifier value is different from the corresponding verification value, the secure booting verification module 1130 of the host 1100 may determine that the boot loader code is falsified.

The second device identifier value may be generated based on the first device identifier value and the first firmware code. As such, when the boot loader code or the first firmware code is falsified, the second device identifier value may not be normally generated. Accordingly, when the second device identifier value is different from the corresponding verification value, the secure booting verification module 1130 of the host 1100 may determine that at least one of the boot loader code and the first firmware code is falsified.

The third device identifier value may be generated based on the second device identifier value and the second firmware code. As such, when the boot loader code, the first firmware code, or the second firmware code is falsified, the third device identifier value may not be normally generated. Accordingly, when the third device identifier value is different from the corresponding verification value, the secure booting verification module 1130 of the host 1100 may determine that at least one of the boot loader code, the first firmware code, and the second firmware code is falsified.

As described above, in the secure booting system 1000 according to an embodiment of the present disclosure, the host 1100 and the electronic device 1200 may share the HPS value and perform the secure booting operation based on the HPS value. That is, the secure booting system 1000 may support symmetric-key based secure booting, and thus, the booting operation may be quickly performed without a hardware accelerator. In the secure booting, the electronic device 1200 may generate the booting value using the HPS value, and the host 1100 may determine whether the boot loader code or the firmware code is falsified, by comparing the booting value and the verification value. Accordingly, the integrity of the boot loader code and the firmware code may be guaranteed.

Figure 2:
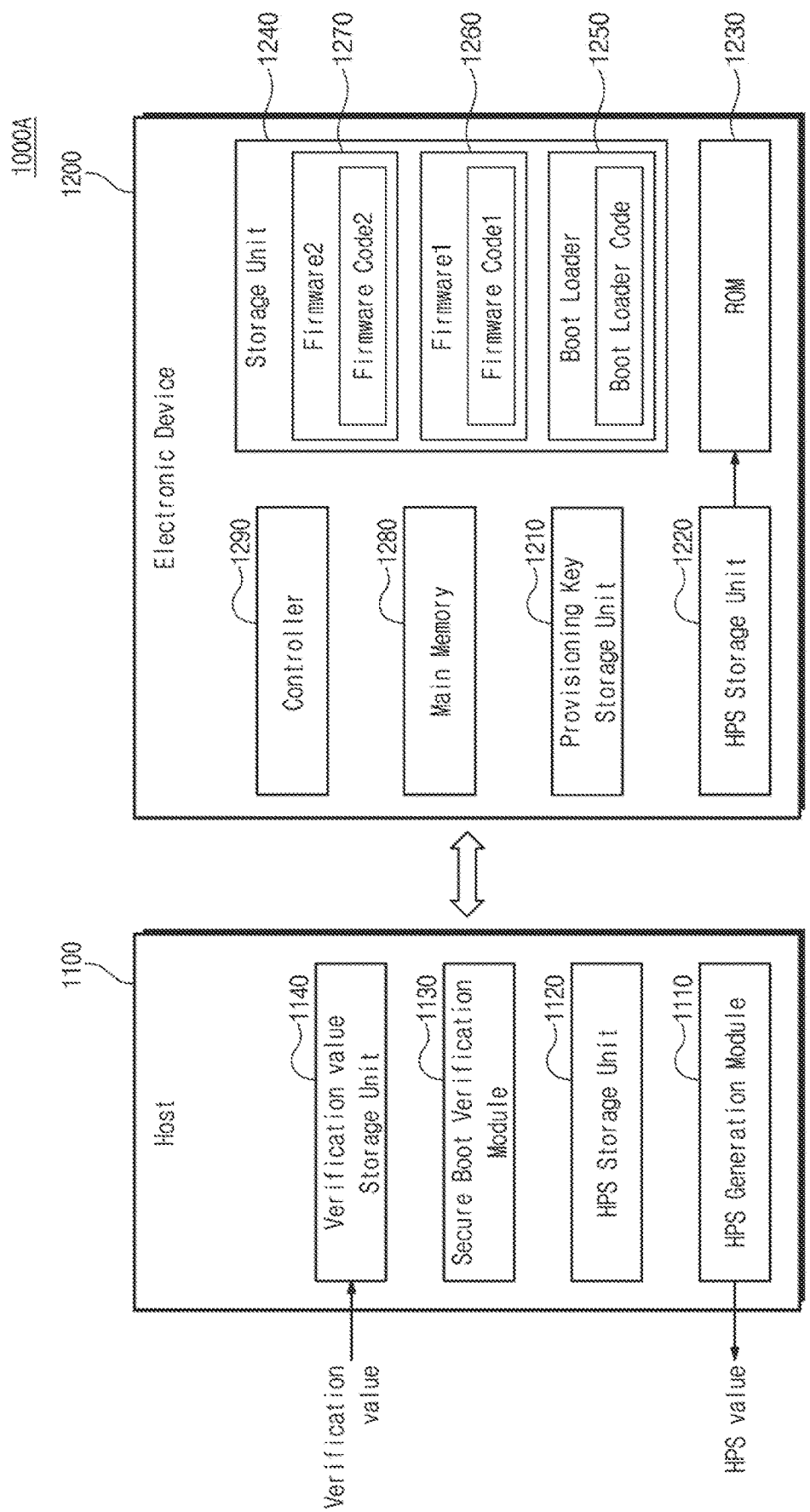
FIG. 2 is a diagram illustrating an example of a secure booting system according to an embodiment of the present disclosure.

FIG. 2 is a diagram illustrating an example of a secure booting system 1000A according to an embodiment of the present disclosure. The secure booting system 1000A that performs the secure booting operation based on the verification value generated by the external firmware release server is illustrated in FIG. 2 as an example. The secure booting system 1000A of FIG. 2 is similar to the secure booting system 1000 of FIG. 1. Accordingly, the same or similar components may be marked by the same or similar reference numerals/signs, and additional description associated with the same or similar components will be omitted to avoid redundancy.

Referring to FIG. 2, the secure booting system 1000A may include the host 1100 and the electronic device 1200.

The host 1100 may send the HPS value to the external firmware release server. The external firmware release server may generate the verification value based on the HPS value received from the host 1100. The host 1100 may receive the verification value from the external firmware release server. The host 1100 may determine whether the boot loader code or the firmware code is falsified, by comparing the verification value received from the external firmware release server and the booting value received from the electronic device 1200. To this end, the host 1100 may include the HPS generation module 1110, the HPS storage unit 1120, the secure booting verification module 1130, and the verification value storage unit 1140.

The HPS generation module 1110 may generate the HPS value and may store the HPS value in the HPS storage unit

1120. The HPS generation module 1110 may send the HPS value to the external firmware release server.

The verification value storage unit 1140 may receive and store the verification value from the external firmware release server.

The secure booting verification module 1130 may receive the verification value from the verification value storage unit 1140 and may receive the booting value from the electronic device 1200. The secure booting verification module 1130 may determine whether the boot loader code or the firmware code of the electronic device 1200 is falsified, based on a result of comparing the booting value and the verification value.

When booted up, the electronic device 1200 may generate the booting value for the booting operation and may provide the generated booting value to the host 1100. To this end, the electronic device 1200 may include a provisioning key storage unit 1210, the HPS storage unit 1220, the ROM 1230, a storage unit 1240, a main memory 1280, and a controller 1290, and the storage unit 1240 may include the boot loader 1250, the first firmware 1260 and the second firmware 1270.

The provisioning key storage unit 1210 may store a unique provisioning key of the electronic device 1200. For example, the provisioning key may be generated in the process of manufacturing the electronic device 1200 and may be stored in the provisioning key storage unit 1210. The provisioning key stored in the provisioning key storage unit 1210 may be used as a key of the RSA algorithm being a public key-based encryption technique; in particular, the provisioning key may be used when the HPS value generated by the host 1100 is stored in the electronic device 1200. In an embodiment, the provisioning key storage unit 1210 may be implemented with an OTP memory, a mask ROM, a PROM, an EPROM, an EEPROM, or a flash memory.

The HPS storage unit 1220 may store the HPS value generated by the host 1100. The HPS storage unit 1220 may be implemented with an OTP memory or an E-fuse circuit, but the present disclosure is not limited thereto. In an embodiment, the HPS storage unit 1220 may be implemented with one storage unit together with the provisioning key storage unit 1210.

The ROM 1230 may store the ROM code. The ROM code, when executed, may cause at least one processor (e.g., the controller 1290) to receive the HPS value from the HPS storage unit 1220 and receive the boot loader code from the boot loader 1250. The ROM code, when executed, may cause at least one processor (e.g., the controller 1290) to generate the first device identifier value based on the HPS value and the boot loader code.

The storage unit 1240 may store the boot loader 1250, the first firmware 1260, and the second firmware 1270. The storage unit 1240 may implemented with a nonvolatile memory. For example, the storage unit 1240 may implemented with an EEPROM, a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or a memory similar thereto.

The boot loader 1250 may include the boot loader code, and the boot loader code, when executed, may cause at least one processor (e.g., the controller 1290) to generate the second device identifier value based on the first device identifier value received from the ROM 1230 and the first firmware code received from the first firmware 1260.

The first firmware 1260 may include the first firmware code, and the first firmware code, when executed, may cause at least one processor (e.g., the controller 1290) to generate the third device identifier value based on the second device identifier value received from the boot loader 1250 and the second firmware code received from the second firmware 1270.

According to an embodiment of the present disclosure, the electronic device 1200 may provide the host 1100 with at least one of the first to third device identifier values generated in the booting operation. The host 1100 may determine whether the boot loader code or the first and second firmware codes of the electronic device 1200 are falsified, based on a result of comparing the booting value received from the electronic device 1200 and the verification value received from the external firmware release server.

The main memory 1280 may be a volatile memory and may be provided as a working memory of the electronic device 1200. For example, the main memory 1280 may be implemented with a dynamic random access memory (DRAM), a static random access memory (SRAM), a mobile DRAM, or a memory similar thereto. However, the present disclosure is not limited thereto. For example, the main memory 1280 may be implemented with a nonvolatile memory.

The controller 1290 may include at least one processor and may control an overall operation of the electronic device 1200.

As described above, the secure booting system 1000A according to an embodiment of the present disclosure may use the public key-based encryption technique when the HPS value generated by the host 1100 is stored in the electronic device 1200. Accordingly, the confidentiality for the HPS value may be guaranteed. Also, when performing the secure booting operation, the secure booting system 1000A may determine whether the boot loader code and the firmware code are falsified, based on the booting value and the verification value that are generated based on the HPS value. Accordingly, the fast booting operation may be possible without a hardware accelerator, and the integrity of the boot loader code and the firmware code may also be guaranteed.

Below, an operation method of the secure booting system 1000A according to an embodiment of the present disclosure will be described.

Figure 3A:
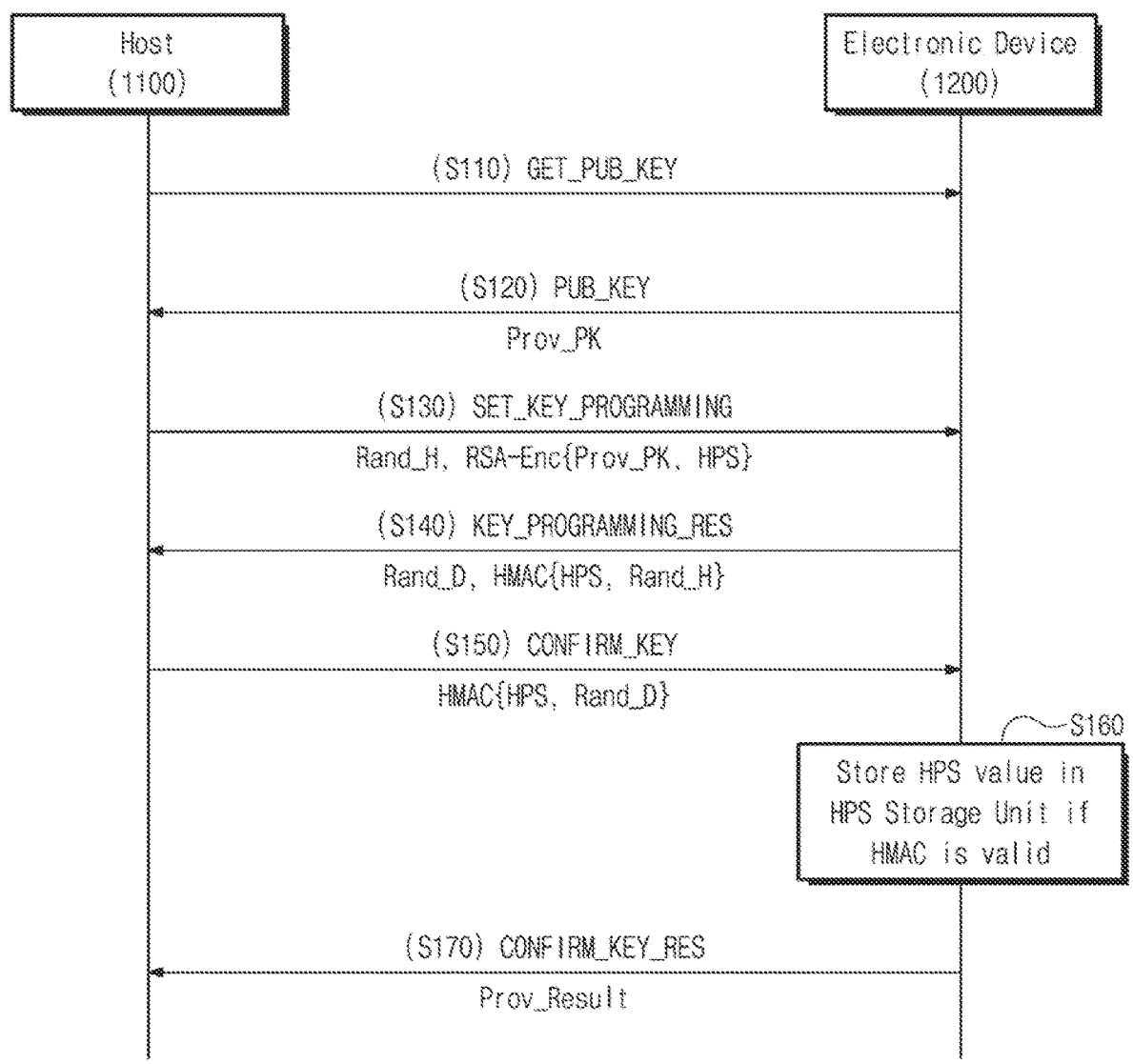
FIG. 3A is a flowchart illustrating an example of a protocol for safely storing a host pre-installed secret (HPS) value generated by a host in an electronic device according to an embodiment of the present disclosure.
Figure 3B:
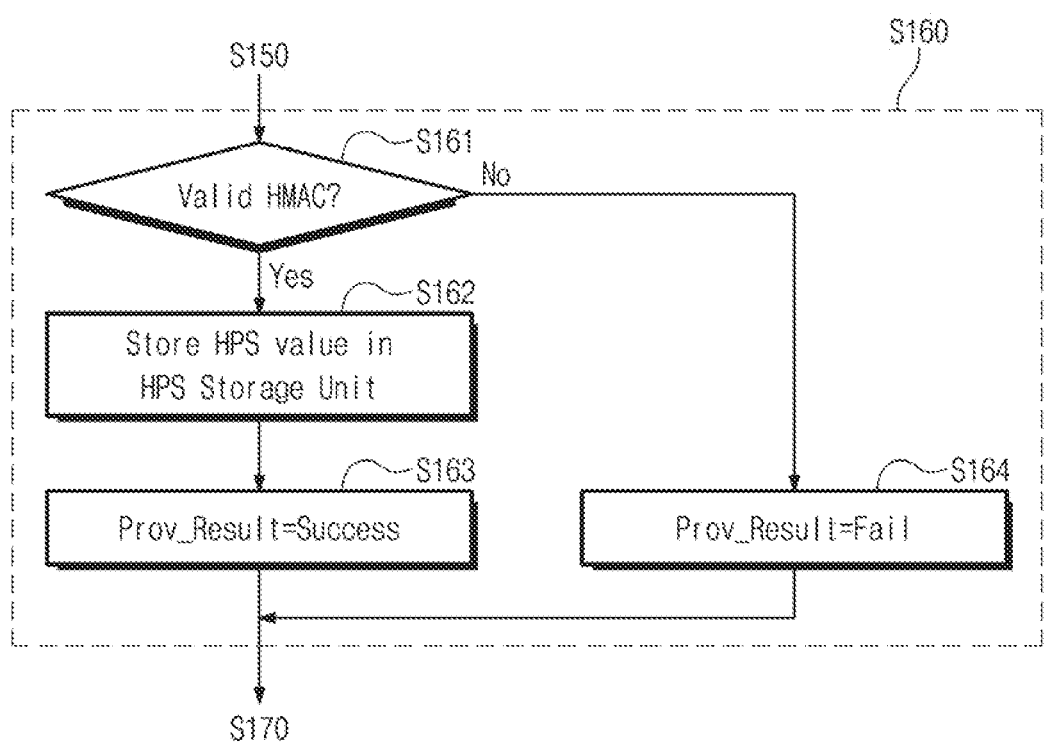
FIG. 3B is a flowchart illustrating an example of an operation method of an electronic device according to whether an HPS value is valid according to an embodiment of the present disclosure.

FIG. 3A is a flowchart illustrating an example of a protocol for safely storing an HPS value generated by the host 1100 in the electronic device 1200 according to an embodiment of the present disclosure. FIG. 3B is a flowchart illustrating an example of an operation method of the electronic device 1200 according to whether an HPS value is valid according to an embodiment of the present disclosure.

Referring to FIG. 3A, in operation S110, the host 1100 may send a public key request message GET_PUB_KEY to the electronic device 1200. For example, the host 1100 may request the public key of the RSA algorithm from the electronic device 1200.

In operation S120, the electronic device 1200 may return the public key to the host 1100. For example, the provisioning key storage unit 1210 of the electronic device 1200 may store a public key Prov_PK and a private key Prov_SK as a unique key, and the electronic device 1200 may return the public key Prov_PK to the host 1100. In this case, as an exponent value of the public key Prov_PK, "0x10001" may be used like a conventional case. Accordingly, the electronic device 1200 may return only a modulus value of the public key Prov_PK to the host 1100.

In operation S130, the host 1100 may send a key program message SET_KEY_PRGRAMMING to the electronic device 1200. That is, the host 1100 may request the electronic device 1200 to store the HPS value. In this case, the key program message SET_KEY_PRGRAMMING may include "Rand_H" and "RSA-Enc{Prov_PK, HPS}" as a parameter. "Rand_H" may be a random value that the host 1100 generates randomly, and "HPS" may be the HPS value that the host 1100 intends to set. The host 1100 may encrypt the HPS value using the public key Prov_PK received from the electronic device 1200 before sending the HPS value to the electronic device 1200.

In operation S140, the electronic device 1200 may send a key program response message KEY_PROGRAMMING_RES to the host 1100. In this case, the key program response message KEY_PROGRAMMING_RES may include "Rand_D" and "hash-based message authentication code (HMAC) {HPS, Rand_H}" as a parameter. "Rand_D" may be a random value that the electronic device 1200 generates randomly, and "HMAC {HPS, Rand_H}" may be an HMAC value generated by applying the HMAC algorithm to "HPS" and "Rand_H". The host 1100 may determine whether the electronic device 1200 receives the HPS value normally, by verifying the HMAC value received from the electronic device 1200.

In operation S150, the host 1100 may send a confirm key message CONFIRM_KEY to the electronic device 1200. Herein, the confirm key message CONFIRM_KEY may be a message for checking that the HPS value is normally transferred to the electronic device 1200. The confirm key message CONFIRM_KEY may include "HMAC {HPS, Rand_D}" as a parameter, and "HMAC {HPS, Rand_D}" may be an HMAC value generated by applying the HMAC algorithm to "HPS" and "Rand_D".

In operation S160, the electronic device 1200 may determine whether the HPS value that the host 1100 sends is the normal HPS value, based on the HMAC value. When the HPS value is the normal HPS value, the electronic device 1200 may store the HPS value in the HPS storage unit 1220.

Referring to FIG. 3B, in operation S161, the electronic device 1200 may determine whether the HPS value is falsified, based on the HMAC value. In operation S161, when the HPS value is a valid value, the electronic device, in operation S162, 1200 may store the HPS value in the HPS storage unit 1220. Afterwards, in operation S163, the electronic device 1200 may set a success message such that "Prov_Result" being a parameter to be transferred to the host 1100 includes the success message. When the HMAC value is invalid in operation S161, the electronic device 1200, in operation S164, may not store the HPS value in the HPS storage unit 1220 and may set "Prov_Result" such that the "Prov_Result" includes the fail message.

Referring to FIG. 3A, in operation S170, the electronic device 1200 may return a confirm key response message CONFIRM_KEY_RES to the host 1100. The confirm key response message CONFIRM_KEY_RES may include "Prov_Result" as a parameter. When the normal HPS value is stored in the electronic device 1200, "Prov_Result" may include the success message. When the normal HPS value is not transferred to the electronic device 1200, "Prov_Result" may include the fail message.

As described above, the HPS value generated by the host 1100 may be safely stored in the electronic device 1200 based on the public key-based encryption algorithm.

Figure 4:
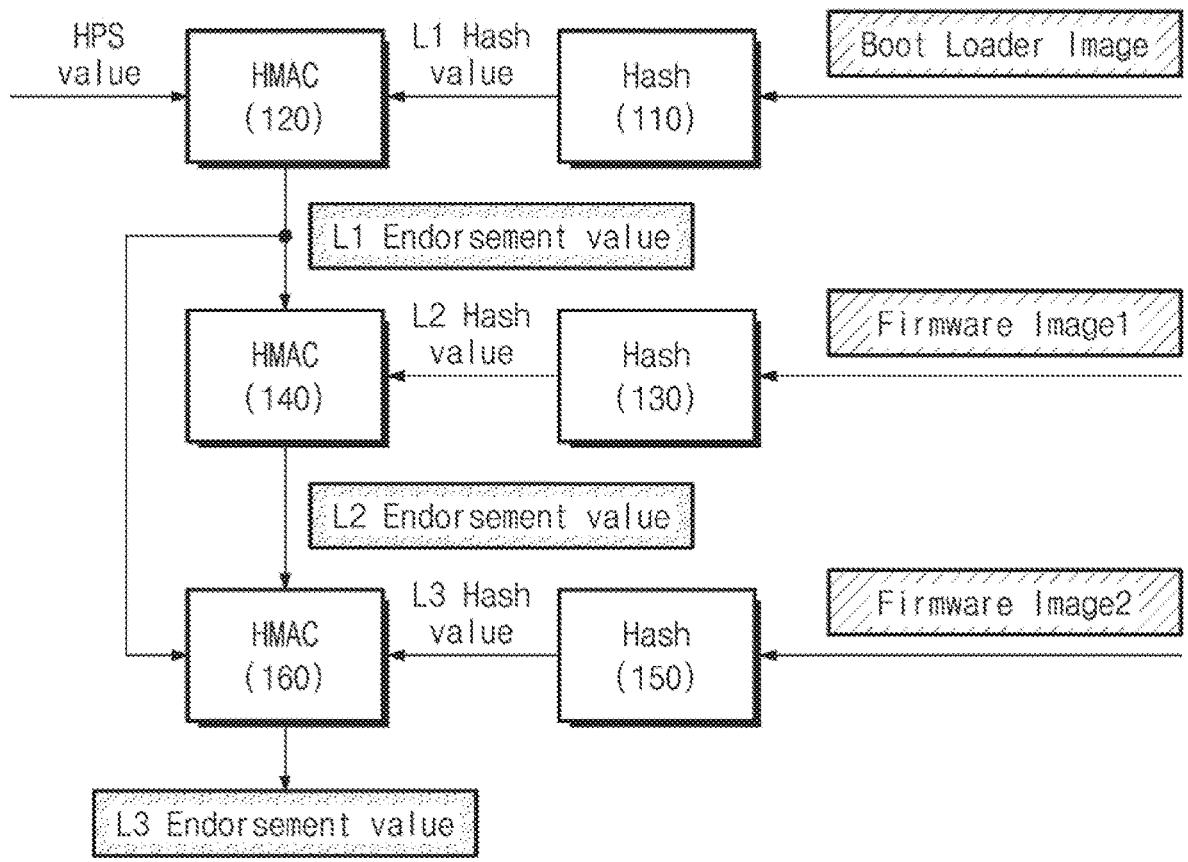
FIG. 4 is a diagram illustrating an example in which an external firmware release server generates a verification value based on an HPS value according to an embodiment of the present disclosure.
Figure 5A:
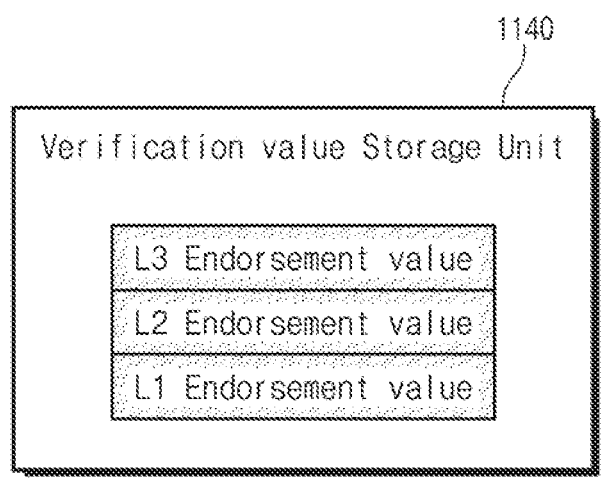
FIGS. 5A and 5B are diagrams illustrating an example in which a host stores a verification value in a verification value storage unit according to an embodiment of the present disclosure.
Figure 5B:
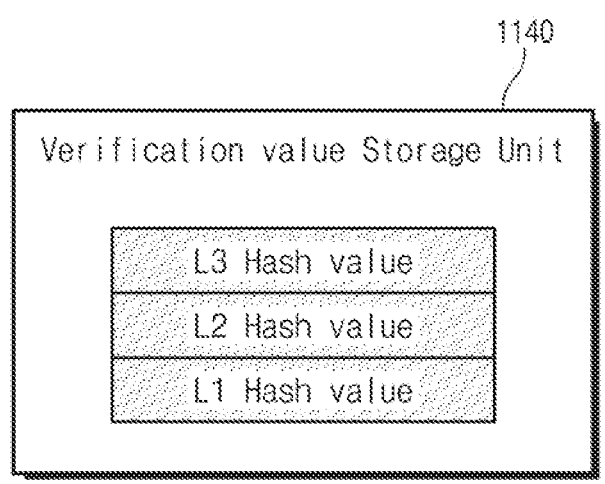

FIG. 4 is a diagram illustrating an example in which the external firmware release server generates the verification value based on the HPS value according to an embodiment of the present disclosure. FIGS. 5A and 5B are diagrams illustrating an example in which the host 1100 stores the verification value in the verification value storage unit 1140 according to an embodiment of the disclosure.

Referring to FIG. 4, the external firmware release server may generate the verification value through the HMAC algorithm.

A hash algorithm 110 may receive a boot loader image and may generate a first hash value (L1 Hash value) corresponding thereto.

An HMAC algorithm 120 may receive the HPS value from the host 1100 and may generate a first endorsement value (L1 Endorsement value) based on the HPS value and the first hash value. That is, the HMAC algorithm 120 may output the first endorsement value as the HMAC value using the HPS value as an input key of HMAC function and using the first hash value as input data of the HMAC function.

A hash algorithm 130 may receive a first firmware image (Firmware Image1) and may generate a second hash value (L2 Hash value) corresponding thereto.

An HMAC algorithm 140 may generated a second endorsement value (L2 Endorsement value) based on the first endorsement value received from the HMAC algorithm 120 and the second hash value output from the hash algorithm 130.

A hash algorithm 150 may receive a second firmware image (Firmware Image2) and may generate a third hash value (L3 Hash value) corresponding thereto.

An HMAC algorithm 160 may generate a third endorsement value (L3 Endorsement value) based on the second endorsement value received from the HMAC algorithm 140 and the third hash value output from the hash algorithm 150.

In an embodiment, the first to third endorsement values may be used as the verification value. In this case, as illustrated in FIG. 5A, the first to third endorsement values may be transferred to the host 1100, and the host 1100 may store the first to third endorsement values in the verification value storage unit 1140.

In an embodiment, the first to third hash values may be used as the verification value. In this case, as illustrated in FIG. 5B, the first to third hash values may be transferred to the host 1100, and the host 1100 may store the first to third hash values in the verification value storage unit 1140.

However, the present disclosure is not limited thereto. For example, all of the first to third endorsement values and the first to third hash values may be used as the verification value, or some of the first to third endorsement values and the first to third hash values may be used as the verification value.

As described above, the external firmware release server may generate the verification value based on the HPS value, and the host 1100 may store the verification value generated by the external firmware release server.

In FIG. 4, the HMAC algorithms 120, 140, and 160 may be substantially the same algorithm, and the hash algorithms 110, 130, and 150 may be substantially the same algorithm. Instead of the HMAC algorithm, there may be used a message authentication code based on universal hashing (UMAC) algorithm, a cipher-based message authentication code (CMAC) algorithm, a block cipher-based message authentication code (VMAC) algorithm using a universal hash, or an algorithm similar thereto.

Figure 6:
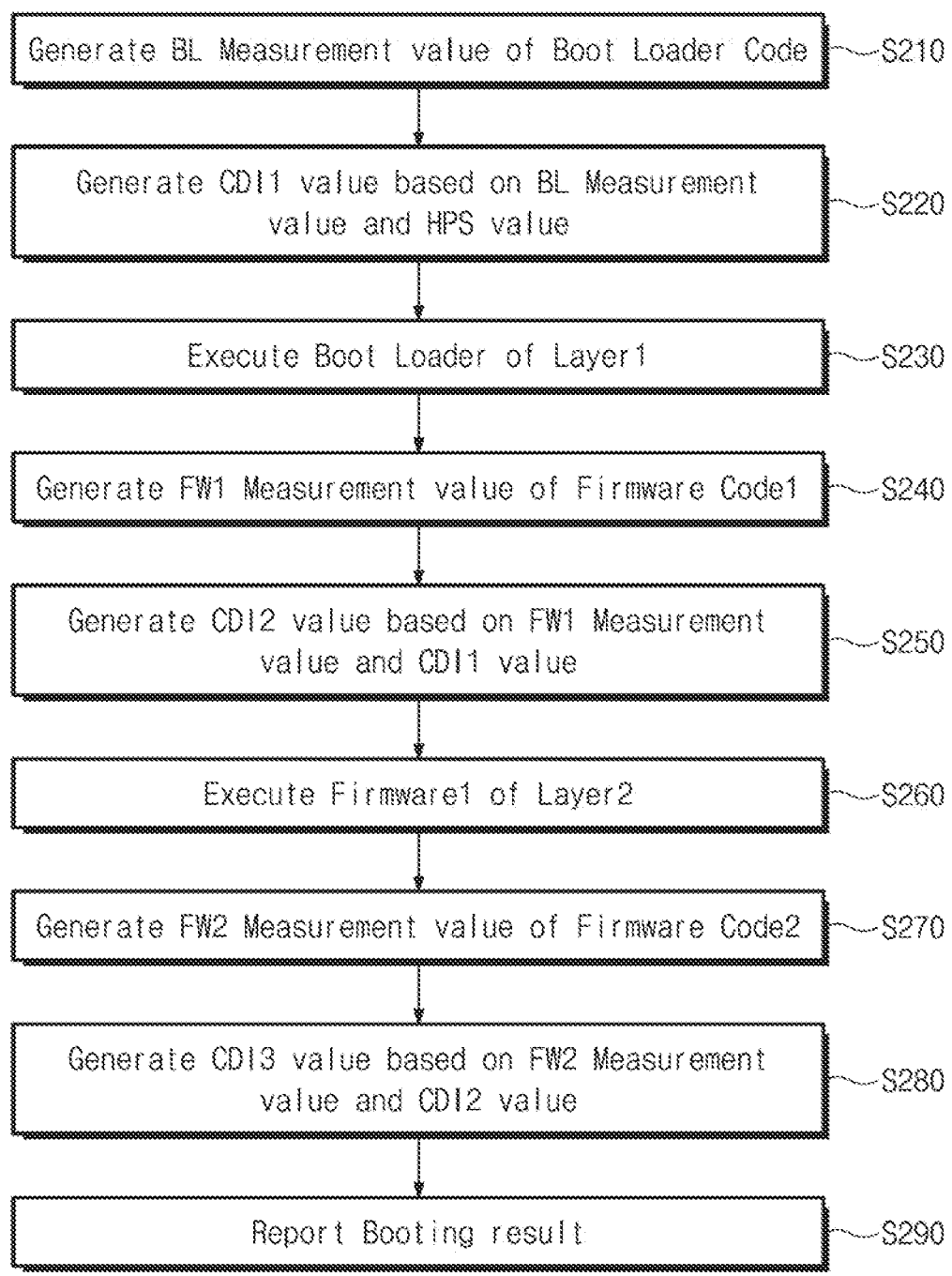
FIG. 6 is a flowchart illustrating an example of a secure booting operation of an electronic device according to an embodiment of the present disclosure.
Figure 7:
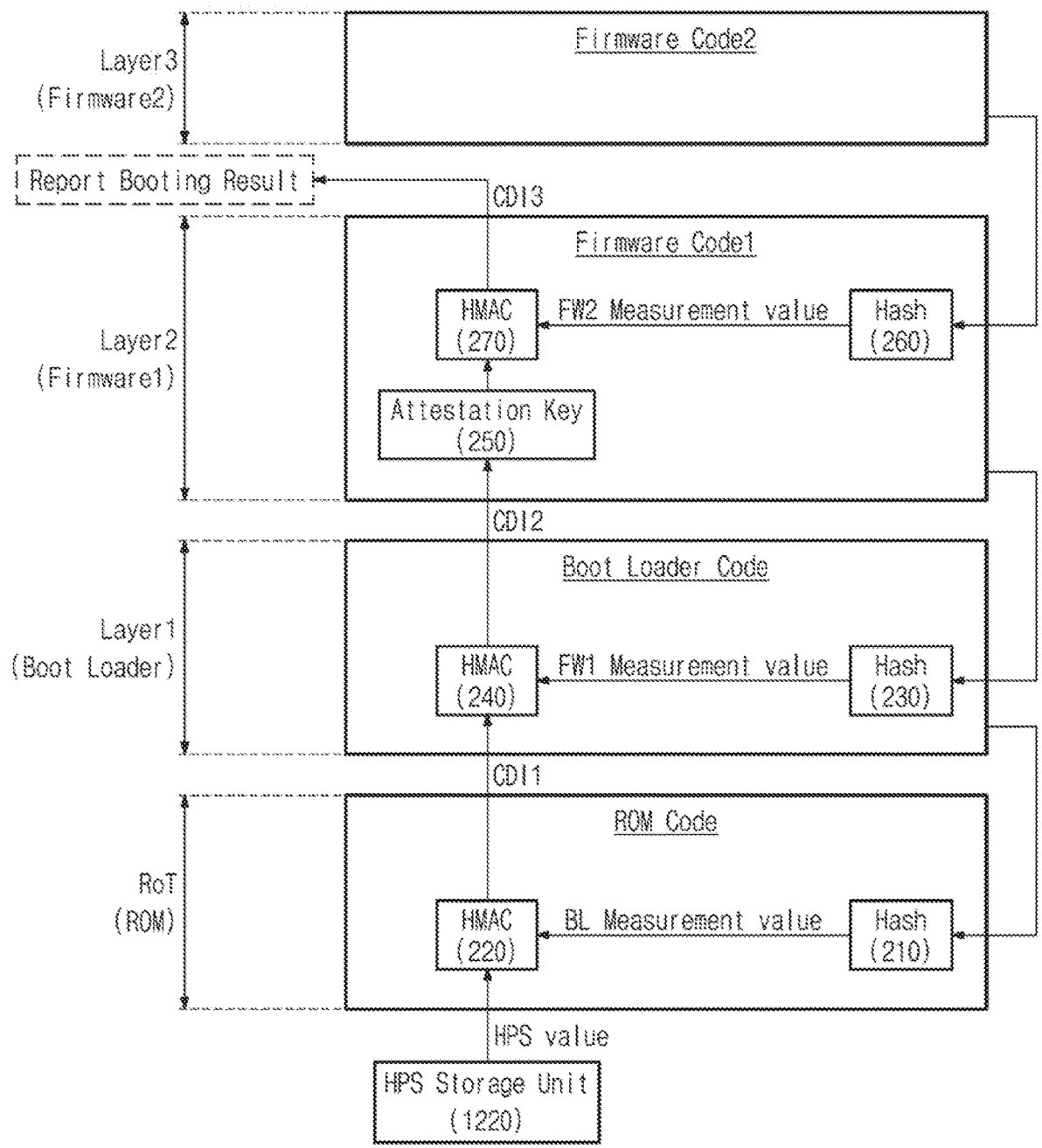
FIG. 7 is a diagram illustrating an example where a booting value is generated by a symmetric key-based hash-based message authentication code (HMAC) algorithm according to an embodiment of the present disclosure.

FIG. 6 is a flowchart illustrating an example of a secure booting operation of an electronic device according to an embodiment of the present disclosure. FIG. 7 is a diagram illustrating an example where a booting value is generated by a symmetric key-based HMAC algorithm according to an embodiment of the present disclosure. FIGS. 6 and 7 are diagrams for describing a booting operation of the electronic device 1200 in detail. In FIGS. 6 and 7, the ROM 1230, the boot loader 1250, the first firmware 1260, and the second firmware 1270 may constitute a layer structure of a root of trust (RoT), a first layer (Layer1), a second layer (Layer2), and a third layer (Layer3). Also, for convenience of description, it is assumed that the ROM code includes a hash algorithm 210 and an HMAC algorithm 220, the boot loader code includes a hash algorithm 230 and an HMAC algorithm 240, and the first firmware code includes a hash algorithm 260 and an HMAC algorithm 270.

Referring to FIGS. 6 and 7, in operation S210, a boot leader (BL) measurement value of the boot loader code may be generated. In other words, the RoT, that is, the ROM code stored in the ROM 1230 may be executed. The hash algorithm 210 included in the ROM code may generate a BL measurement value corresponding to the boot loader code.

In operation S220, the CDI1 values may be generated based on the BL measurement value and the HPS value. The HMAC algorithm 220 included in the ROM code may generate a first device identifier value CDI1 based on the HPS value received from the HPS storage unit 1220 and the BL measurement value output from the hash algorithm 210.

In operation S230, the boot loader of Layer1 may be executed. The boot loader 1250 being the first layer may be executed.

In operation S240, the FW1 measurement value of Firmware Code 1 may be generated. The hash algorithm 230 included in the boot loader code being the first layer may generate a first firmware measurement value (FW1 Measurement value) corresponding to the first firmware code.

In operation S250, the CDI2 values may be generated based on the FW1 measurement value and the CDI1 value. The HMAC algorithm 240 included in the boot loader code may generate a second device identifier value CDI2 based on the first device identifier value CDI1 received from the ROM 1230 and the first firmware measurement value output from the hash algorithm 230.

In operation S260, Firmware1 of Layer2 may be executed. The first firmware 1260 being the second layer may be executed.

In operation S270, the FW2 measurement value of Firmware Code2 may be generated. The hash algorithm 260 included in the first firmware 1260 being the second layer may generate a second firmware measurement value (FW2 Measurement value) corresponding to the second firmware code.

In operation S280, a CDI3 value may be generated based on the FW2 measurement value and the CDI2 value. An attestation key algorithm 250 included in the first firmware code may set the second device identifier value CDI2 to an attestation key, and the HMAC algorithm 270 may generate a third device identifier value CDI3 based on the attestation key and the second firmware measurement value output from the hash algorithm 260.

In operation S290, the electronic device 1200 may report a booting result to the host 1100. For example, the electronic device 1200 may report the booting result to the host 1100 using the first to third device identifier values CDI1 to CDI3 as the booting value. As another example, the electronic device 1200 may report the booting result to the host 1100 using the first to third firmware measurement values FW1 to FW3 as the booting value. However, the present disclosure is not limited thereto. For example, the booting value may include both the first to third device identifier values and the first to third firmware measurement values, or may include some of the first to third device identifier values and the first to third firmware measurement values.

Figure 8A:
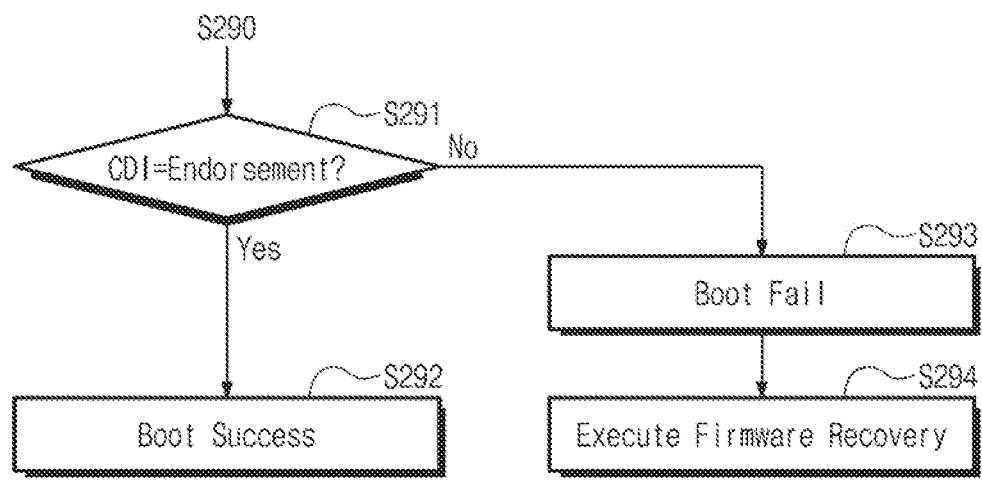
FIGS. 8A and 8B are flowcharts illustrating an example of an operation of a secure booting verification module of a host according to an embodiment of the present disclosure.
Figure 8B:
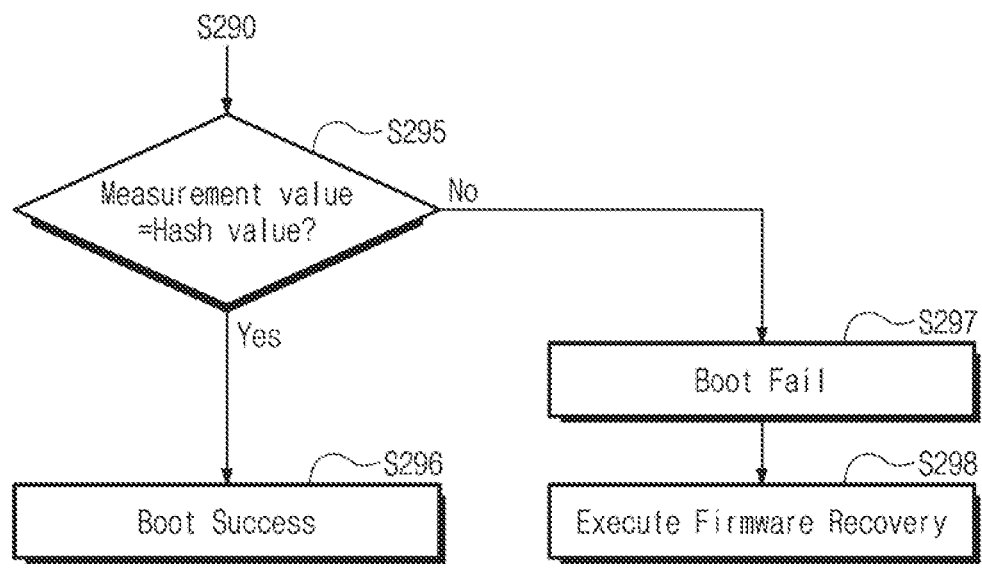

FIGS. 8A and 8B are flowcharts illustrating an example of an operation of the secure booting verification module 1130 of the host 1100 according to an embodiment of the present disclosure. In an embodiment, an example in which a verification operation is performed using the device identifier value CDI and the endorsement value as the booting value and the verification value respectively is illustrated in FIG. 8A, and an example in which a verification operation is performed using the firmware measurement value and the hash value as the booting value and the verification value respectively is illustrated in FIG. 8B. For convenience of description, FIG. 8A will be described under the assumption that the first to third endorsement values L1 Endorsement value to L3 Endorsement value are stored in the verification value storage unit 1140 as illustrated in FIG. 5A, and FIG. 8B will be described under the assumption that the first to third hash values L1 Hash value to L3 Hash value are stored in the verification value storage unit 1140 as illustrated in FIG. 5B.

Referring to FIG. 8A, in operation S291, the secure booting verification module 1130 of the host 1100 may receive the device identifier value CDI as the booting value and may determine whether the device identifier value CDI is identical to the endorsement value stored in the verification value storage unit 1140.

In an embodiment, the secure booting verification module 1130 of the host 1100 may receive the first device identifier value CDI1. Because the first device identifier value CDI1 is generated based on the boot loader code, when the boot loader code is falsified, the first device identifier value CDI1 may be different from the first endorsement value L1 Endorsement value. Accordingly, when the first device identifier value CDI1 is different from the first endorsement value L1 Endorsement value, the secure booting verification module 1130 may determine that the boot loader code is falsified.

In an embodiment, the secure booting verification module 1130 of the host 1100 may receive the second device identifier value CDI2. Because the second device identifier value CDI2 is generated based on the first device identifier value CDI1 and the first firmware code, when the boot loader code or the first firmware code is falsified, the second device identifier value CDI2 may be different from the second endorsement value L2 Endorsement value. Accordingly, when the second device identifier value CDI2 is different from the second endorsement value L2 Endorsement value, the secure booting verification module 1130 may determine that the boot loader code or the first firmware code is falsified.

In an embodiment, the secure booting verification module 1130 of the host 1100 may receive the third device identifier value CDI3. Because the third device identifier value CDI3 is generated based on the second device identifier value CDI2 and the second firmware code, when the boot loader code, the first firmware code, or the second firmware code is falsified, the third device identifier value CDI3 may be different from the third endorsement value L3 Endorsement value. Accordingly, when the third device identifier value CDI3 is different from the third endorsement value L3 Endorsement value, the secure booting verification module 1130 may determine that the boot loader code, the first firmware code, or the second firmware code is falsified.

When it is determined that at least one of the boot loader code, the first firmware code, and the second firmware code is falsified in operation S291, the host 1100 may determine the booting operation of the electronic device 1200 as a fail (in operation S293). In this case, the host 1100 may stop the booting operation of the electronic device 1200, and may perform the recovery operation for the boot loader code, the first firmware code, or the second firmware code (in operation S294). However, the present disclosure is not limited thereto. For example, the host 1100 may turn off the power of the electronic device 1200 or may reset the electronic device 1200.

When it is determined that all of the boot loader code, the first firmware code, and the second firmware code is safe in operation S291, the host 1100 may determine the booting operation of the electronic device 1200 as a success in operation S292.

In FIG. 8A, whether the boot loader code or the firmware code of the electronic device 1200 is falsified is determined using the device identifier value CDI as the booting value and using the endorsement value as the verification value. However, the present disclosure is not limited thereto. For example, the measurement value may be used as the booting value, and the hash value may be used as the verification value.

The description will be given with reference to FIG. 8B. In operation S295, the secure booting verification module 1130 of the host 1100 may receive the measurement value as the booting value and may determine whether the measurement value is identical to the hash value stored in the verification value storage unit 1140.

In an embodiment, the secure booting verification module 1130 of the host 1100 may receive the BL measurement value. Because the BL measurement value is generated based on the boot loader code, when the boot loader code is falsified, the BL measurement value may be different from the first hash value L1 Hash Value. Accordingly, when the BL measurement value is different from the first hash value L1 Hash Value, the secure booting verification module 1130 may determine that the boot loader code is falsified.

In an embodiment, the secure booting verification module 1130 of the host 1100 may receive the first firmware measurement value FW1 Measurement Value. Because the first firmware measurement value is generated based on the first firmware code, when the first firmware code is falsified, the first firmware measurement value may be different from the second hash value L2 Hash Value. Accordingly, when the first firmware measurement value is different from the second hash value L2 Hash Value, the secure booting verification module 1130 may determine that the first firmware code is falsified. As in the above description, the secure booting verification module 1130 of the host 1100 may receive the second firmware measurement value FW2 Measurement Value. Accordingly, when the second firmware measurement value is different from the third hash value L3 Hash Value, the secure booting verification module 1130 may determine that the second firmware code is falsified.

When it is determined that at least one of the boot loader code, the first firmware code, and the second firmware code is falsified in operation S295, the host 1100 may determine the booting operation of the electronic device 1200 as a fail in operation S297 and perform the recovery operation in operation S298.

When it is determined that all of the boot loader code, the first firmware code, and the second firmware code is safe in operation S295, the host 1100 may determine the booting operation of the electronic device 1200 as a success in operation S296.

As described above, in the secure booting system 1000A according to an embodiment of the present disclosure, the host 1100 and the electronic device 1200 share the HPS value and perform the secure booting operation based on the booting value and the verification value that are generated based on HPS value. Because supporting the symmetric key-based secure booting, the secure booting system 1000A may quickly perform the booting operation without a hardware accelerator and may also guarantee the integrity of the boot loader code and the firmware code.

The operation for reporting the booting value generated by the electronic device 1200 to the host 1100 may be performed through a given protocol. Below, an example of the protocol for reporting the booting value to the host 1100 will be described in detail with reference to FIG. 9.

FIG. 9A is a flowchart illustrating an example of a protocol that allows the electronic device 1200 to report a booting result to the host 1100 according to an embodiment of the present disclosure. In FIG. 9A, it is assumed that the device identifier value CDI is reported as the booting value.

Referring to FIG. 9A, in operation S310, the host 1100 may send a version check message GET_VERSION for checking the version of the protocol to the electronic device 1200. For example, the version of the protocol may start from 1.0.

In operation S320, the electronic device 1200 may return a version response message VERSION for a supportable protocol version to the host 1100.

In operation S330, the host 1100 may send a capabilities check message GET_CAPABILITIES for checking supportable capabilities to the electronic device 1200.

In operation S340, the electronic device 1200 may return a capabilities response message CAPABILITIES including information about the supportable capabilities to the host 1100.

In operation S350, the host 1100 may send an authentication message CHALLENGE for authenticating the electronic device 1200. In this case, the host 1100 may send a first nonce value Nonce_C being a temporary value, which is used for preventing a replay attack in the encryption communications, to the electronic device 1200.

In operation S360, the electronic device 1200 may send an authentication response message CHALLENGE_AUTH to the host 1100. In this case, the electronic device 1200 may return the authentication response message CHALLENGE_AUTH to the host 1100 together with authentication data Auth_Data. The authentication data Auth_Data may include a device identifier summary value CDI_Summary, and the HMAC value for the first nonce and the device identifier summary value CDI_Summary. The device identifier summary value CDI_Summary may be a hash value for a plurality of device identifier values CDI1 to CDIn, for example.

In operation S370, the host 1100 may send a result request message GET_CDI requesting the detailed content for the booting result to the electronic device 1200. In this case, the host 1100 may send a second nonce value Nonce_M being a temporary value to the electronic device 1200.

In operation S380, the electronic device 1200 may return a booting result message CDI including the detailed content for the booting result to the host 1100. In this case, the electronic device 1200 may return the booting result message CDI to the host 1100 together with device identifier data CDI_Data. The device identifier data CDI_Data may include device identifier values CDIs, and the HMAC value for the second nonce and the device identifier values CDIs. Afterwards, the host 1100 may determine whether the boot loader code or the firmware code is falsified, by comparing the device identifier value CDI and the endorsement value.

Figure 9B:
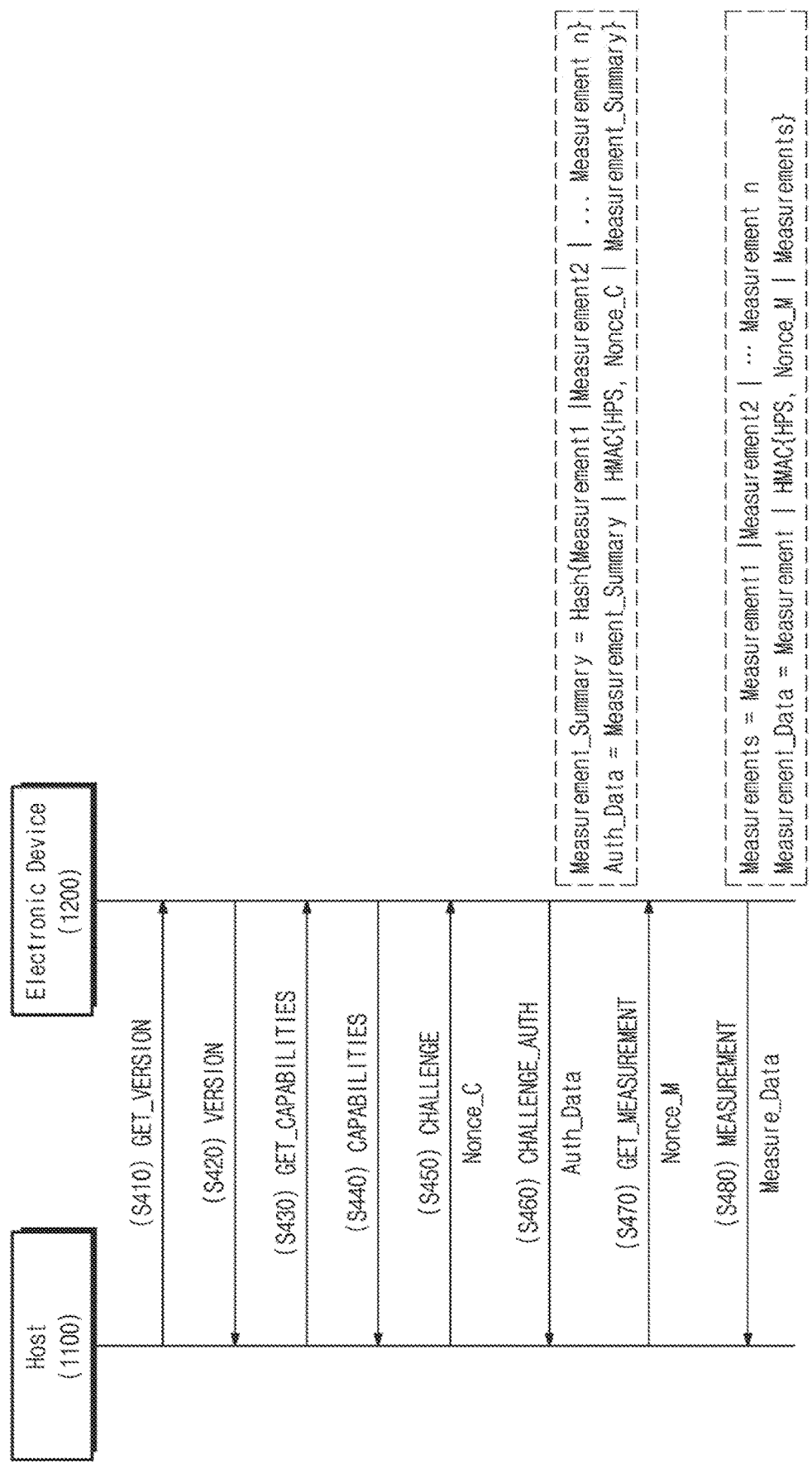
FIG. 9B is a flowchart illustrating an example of a protocol through which an electronic device reports a booting result to a host according to an embodiment of the present disclosure.

FIG. 9B is a flowchart illustrating another example of a protocol through which the electronic device 1200 reports a booting result to the host 1100 according to an embodiment of the present disclosure. For convenience of description, in FIG. 9B, it is assumed that the measurement value is reported as the booting value. The protocol of FIG. 9B is similar to the protocol of FIG. 9A. Thus, for brief description, similar description will be omitted to avoid redundancy.

Referring to FIG. 9B, in operation S410, the host 1100 may send the version check message GET_VERSION to the electronic device 1200. In operation S420, the electronic device 1200 may return the version response message VERSION.

In operation S430, the host 1100 may send the capabilities check message GET_CAPABILITIES to the electronic device 1200. In operation S440, the electronic device 1200 may return the capabilities response message CAPABILITIES.

In operation S450, the host 1100 may send the authentication message CHALLENGE to the electronic device 1200.

In operation S460, the electronic device 1200 may send the authentication response message CHALLENGE_AUTH to the host 1100. In this case, the electronic device 1200 may return the authentication response message CHALLENGE_AUTH to the host 1100 together with the authentication data Auth_Data. The authentication data Auth_Data may include a measurement summary value Measurement_Summary, and the HMAC value for the first nonce and the measurement summary value Measurement_Summary. The measurement summary value Measurement_Summary may be a hash value for a plurality of measurement values BL Measurement value, FW1 Measurement value, and FW2 Measurement value to FWn Measurement value, for example.

In operation S470, the host 1100 may send a result request message GET MEASUREMENT to the electronic device 1200. In this case, the host 1100 may send the second nonce value Nonce_M being a temporary value to the electronic device 1200.

In operation S480, the electronic device 1200 may send a booting result message MEASUEMENT to the host 1100. In this case, the electronic device 1200 may return the booting result message MEASUEMENT to the host 1100 together with measurement data Measurement_Data. The measurement data Measurement_Data may include measurement values Measurements, and an HMAC value for the second nonce and the measurement values Measurements. Afterwards, the host 1100 may determine whether the boot loader code or the firmware code is falsified, by comparing the measurement value and the hash value.

As described with reference to FIGS. 2 to 9B, the secure booting system 1000A according to an embodiment of the present disclosure may operate based on the public key-based encryption technique when sharing the HPS value and may operate based on the symmetric key-based secure booting technique in the booting operation. In particular, in the booting operation, whether the boot loader code or the firmware code is falsified may be determined by comparing the booting value and the verification value that are based on the HPS value.

The above description is provided as an example, and the present disclosure is not limited thereto. Below, various modified examples of the present disclosure will be described in detail.

Figure 10:
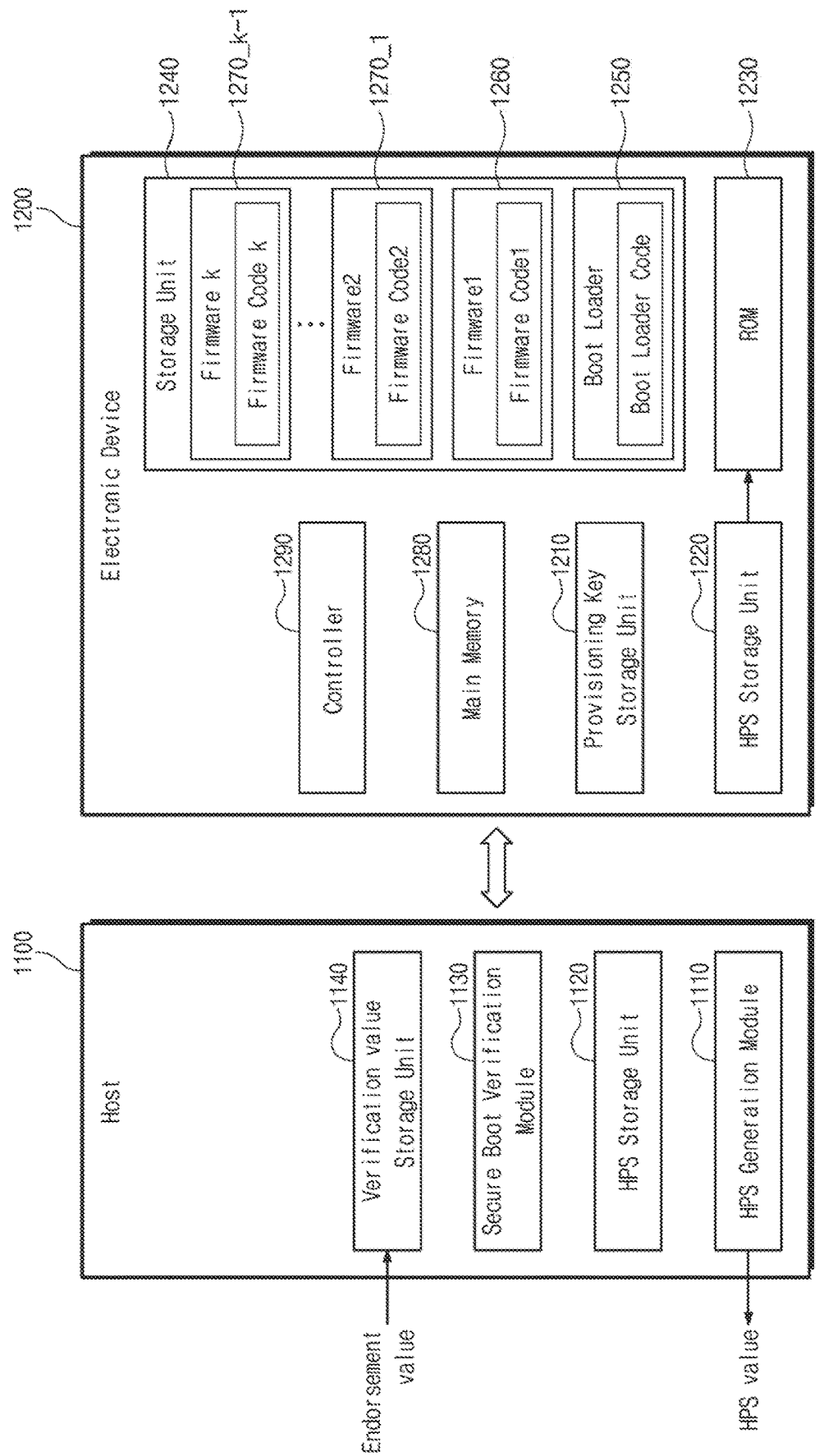
FIG. 10 is a diagram illustrating an example of a secure booting system according to an embodiment of the present disclosure.
Figure 11:
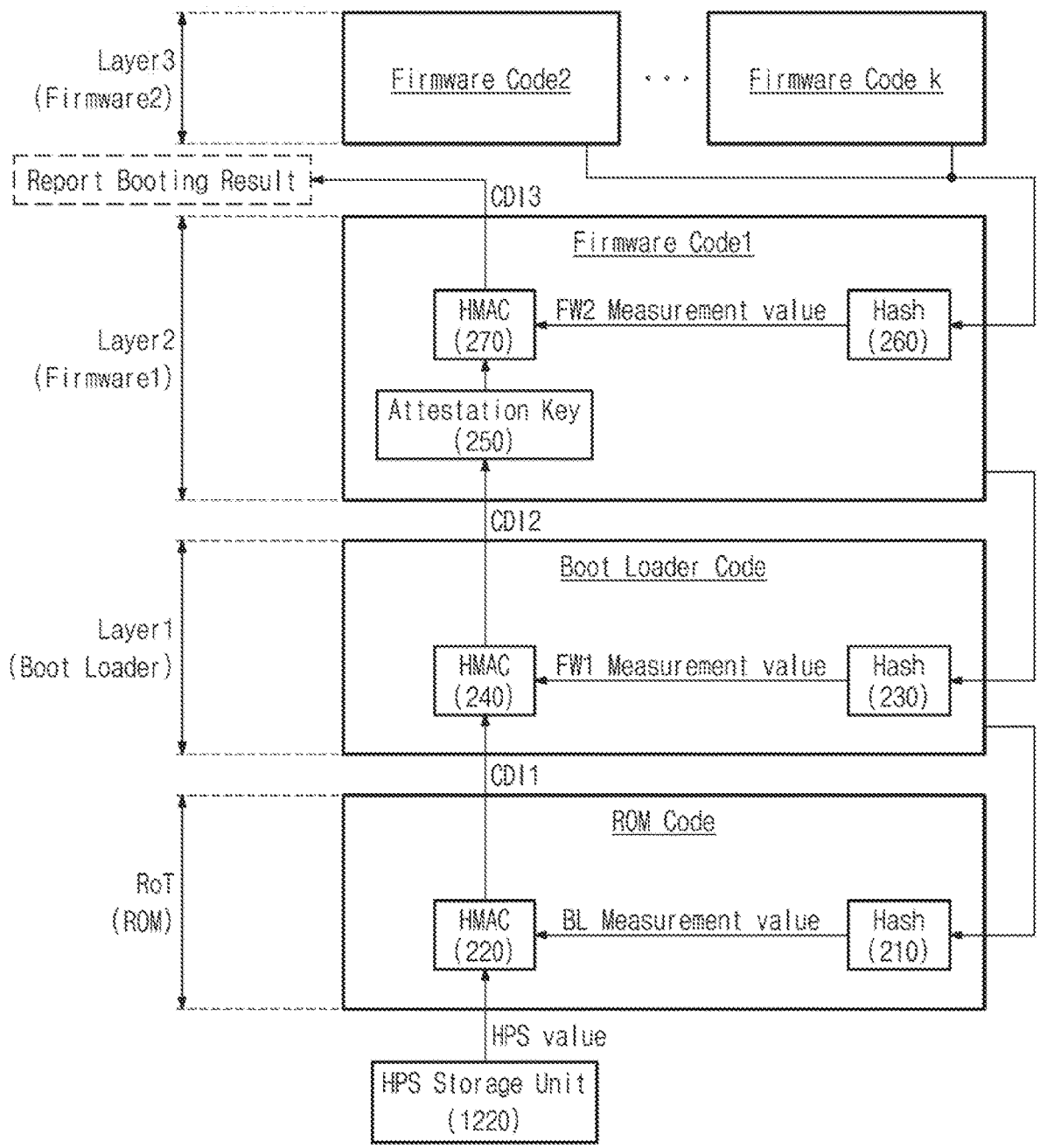
FIG. 11 is a diagram illustrating an example of an operation in which a secure booting system generates a booting value according to an embodiment of the present disclosure.

FIG. 10 is a diagram illustrating an example of a secure booting system 1000B according to an embodiment of the present disclosure. FIG. 11 is a diagram illustrating an example of an operation in which the secure booting system 1000B of FIG. 10 generates a booting value according to an embodiment of the present disclosure. A configuration and an operation of the secure booting system 1000B of FIGS. 10 and 11 are similar to those of the secure booting system 1000A of FIG. 2 and 1000 of FIG. 1. Accordingly, the same or similar components may be marked by the same or similar reference numerals/signs, and additional description associated with the same or similar components will be omitted to avoid redundancy.

Referring to FIG. 10, the secure booting system 1000B may include a plurality of firmware constituting a layer structure. Unlike the secure booting system 1000A of FIG. 2 in which one firmware corresponds to one layer, in the secure booting system 1000B of FIG. 10, a plurality of firmware may correspond to one layer.

For example, the boot loader 1250 may form the first layer Layer1, the first firmware 1260 may form the second layer Layer2, and second to k-th firmware 1270_1 to 1270_k–1 may form the third layer Layer3. That is, a plurality of firmware may correspond to the third layer Layer3. In this case, the second firmware measurement value FW2 Measurement value may be a hash value for all the firmware of the third layer Layer3.

The description will be given with reference to FIG. 11 in detail. The ROM code corresponding to the RoT, when executed, may cause at least one processor (e.g., the controller 1290) to generate the first device identifier value CDI1 based on the BL measurement value and the HPS value corresponding to the boot loader code. The boot loader code corresponding to the first layer Layer1, when executed, may cause at least one processor (e.g., the controller 1290) to generate the second device identifier value CDI2 based on the first device identifier value CDI1 and the first firmware measurement value FW1 Measurement value corresponding to the first firmware code Firmware Code1.

Second to k-th firmware codes Firmware Code2 to Firmware Code k may corresponding to the third layer Layer3. In this case, the first firmware code Firmware Code1 corresponding to the second layer Layer2, when executed, may cause at least one processor (e.g., the controller 1290) to generate one second firmware measurement value FW2 Measurement value based on all the firmware corresponding to the third layer Layer3. For example, the hash algorithm 260 of the first firmware code Firmware Code1 may output a hash value for the second to k-th firmware codes Firmware Code2 to Firmware Code k as the second firmware measurement value FW2 Measurement value. Afterwards, the HMAC algorithm 270 may generate the third device identifier value CDI3 based on the second firmware measurement value FW2 Measurement value and the second device identifier value CDI2.

In this case, when one of the pieces of firmware corresponding to the third layer Layer3 is falsified, the second firmware measurement value FW2 Measurement value and the third device identifier value CDI3 corresponding thereto may not be normally generated. As described above, as a plurality of firmware are implemented to belong to the third layer Layer3, it may be possible to quickly determine whether the falsified firmware is present in the plurality of firmware.

Figure 12:
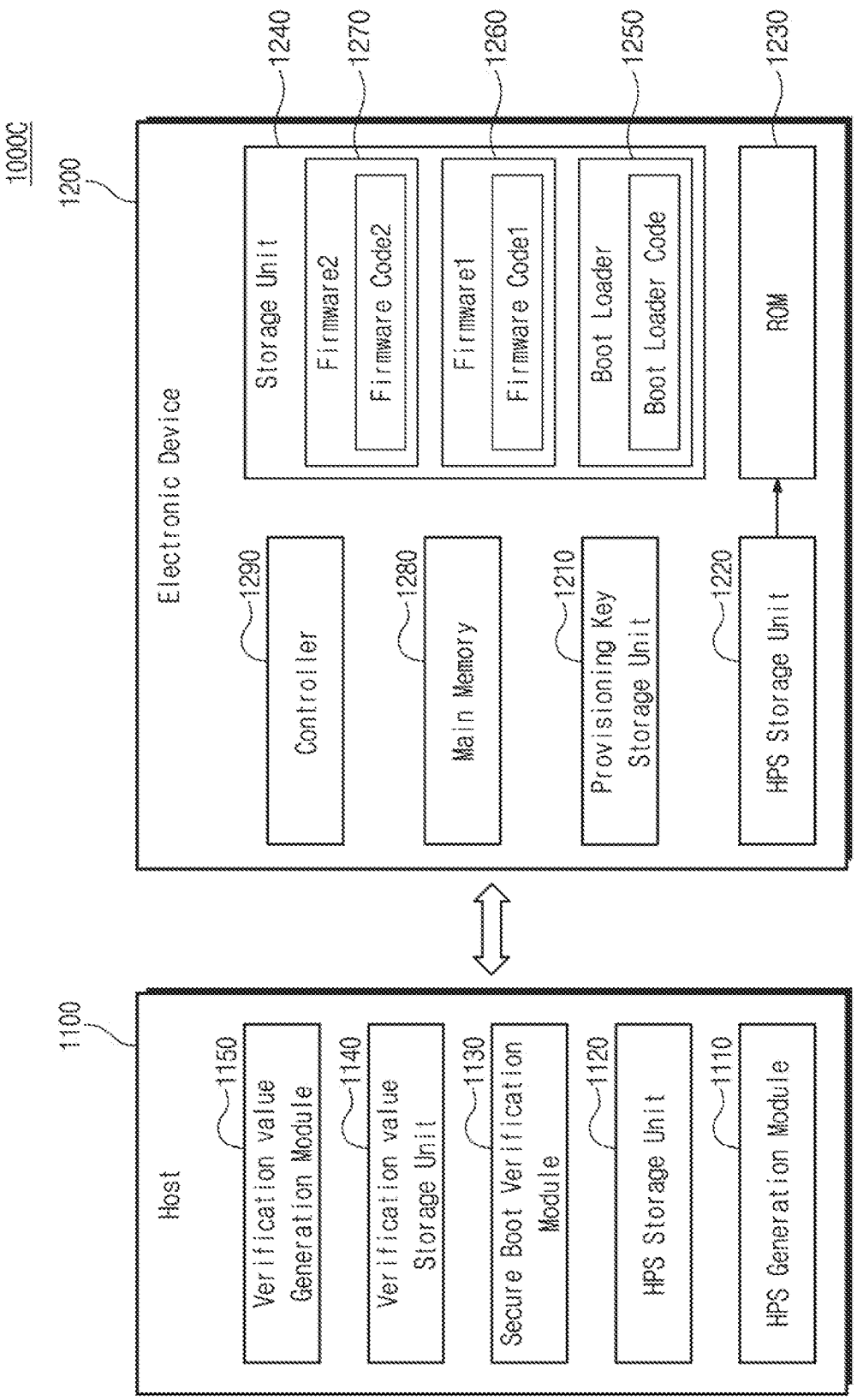
FIG. 12 is a diagram illustrating an example of a secure booting system according to an embodiment of the present disclosure.
Figure 13:
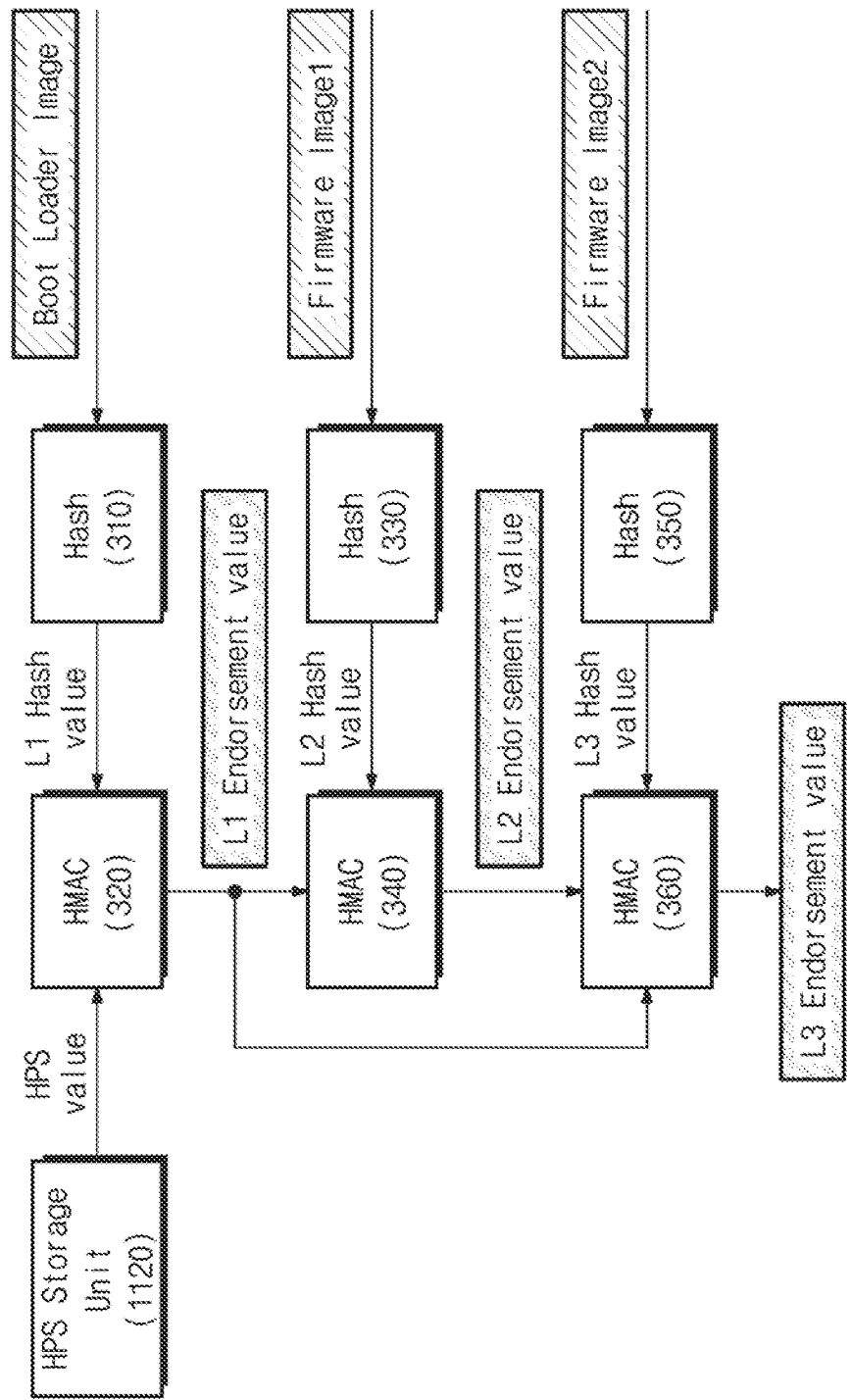
FIG. 13 is a diagram illustrating an example of an operation in which a secure booting system generates a verification value according to an embodiment of the present disclosure.

FIG. 12 is a diagram illustrating an example of a secure booting system 1000C according to an embodiment of the present disclosure. FIG. 13 is a diagram illustrating an example of an operation in which the secure booting system 1000C of FIG. 12 generates a verification value according to an embodiment of the present disclosure. A configuration and an operation of the secure booting system 1000C of FIGS. 12 and 13 are similar to those of the secure booting system 1000 of FIG. 1, 1000A of FIG. 2, and 1000B of FIG. 10. Accordingly, the same or similar components may be marked by the same or similar reference numerals/signs, and additional description associated with the same or similar components will be omitted to avoid redundancy.

Unlike the secure booting system 1000A of FIG. 2 which receives the verification value generated by the external firmware release server, in the secure booting system 1000C of FIG. 12, the host 1100 may generate the verification value. To this end, the host 1100 may further include a verification value generation module 1150.

The description will be given with reference to FIG. 13 in detail. The verification value generation module 1150 may generate the verification value through the HMAC algorithm. For example, the verification value generation module 1150 may include hash algorithms 310, 330, and 350 and HMAC algorithms 320, 340, and 360. The verification value generation module 1150 may generate the first to third endorsement values L1 Endorsement value to L3 Endorsement value or the first to third hash values L1 Hash value to L3 Hash value based on the HPS value, the boot loader image, and the firmware images.

A secure booting system according to an embodiment of the present disclosure may perform secure booting at high speed.

Each of the embodiments provided in the above description is not excluded from being associated with one or more features of another example or another embodiment also provided herein or not provided herein but consistent with the disclosure While the disclosure has been particularly shown and described with reference to embodiments thereof, it will be understood that various changes in form and details may be made therein without departing from the spirit and scope of the following claims.

What is claimed is:

1. A booting system, comprising:
a host; and
an electronic device electrically connected to the host, the electronic device comprising:
at least one processor;
a first storage memory configured to store a secret value set by the host;
a second storage memory configured to store a boot loader code, a first firmware code, and a second firmware code; and
a read-only memory (ROM) configured to store a ROM code executable in a booting operation,
wherein the ROM code, when executed, causes the at least one processor to generate a first device identifier value based on the secret value and a first hash value for the boot loader code,
wherein the boot loader code, when executed, causes the at least one processor to generate a second device identifier value based on the first device identifier value and a second hash value for the first firmware code,
wherein the first firmware code, when executed, causes the at least one processor to generate a third device identifier value based on the second device identifier value and a third hash value for the second firmware code, and
wherein the electronic device is configured to perform the booting operation based on the secret value set by the host, and to determine whether booting succeeds by sending the third device identifier value to the host and determining that at least one of the boot loader code, the first firmware code, and the second firmware code is falsified based on the third device identifier value being different from a corresponding verification value.

2. The booting system of claim 1, wherein the host comprises:
a host pre-installed secret (HPS) generation module configured to generate the secret value;
a third storage memory configured to store the secret value;
a verification value storage module configured to store at least one verification value generated based on the secret value; and
a secure booting verification module configured to determine whether the secure booting succeeds, based on the at least one of the first device identifier value, the second device identifier value, and the third device identifier value obtained from the electronic device and the at least one verification value.

3. The booting system of claim 2, wherein the at least one verification value comprises:
a first verification value generated based on the secret value and a fourth hash value for a boot loader image;
a second verification value generated based on the first verification value and a fifth hash value of a first firmware image; and
a third verification value generated based on the second verification value and a sixth hash value of a second firmware image.

4. The booting system of claim 3, wherein the secure booting verification module is further configured to determine that the boot loader code is falsified based on the first device identifier value being different from the first verification value.

5. The booting system of claim 3, wherein the secure booting verification module is further configured to determine that at least one of the boot loader code and the first firmware code is falsified based on the second device identifier value being different from the second verification value.

6. The booting system of claim 3, wherein the secure booting verification module is further configured to determine that at least one of the boot loader code, the first firmware code, and the second firmware code is falsified based on the third device identifier value being different from the third verification value.

7. The booting system of claim 2, wherein the verification value storage module is further configured to receive the at least one verification value from an external firmware release server.

8. The booting system of claim 2, wherein the host further comprises:
a verification value generation module configured to generate the at least one verification value based on the secret value.

9. The booting system of claim 1, wherein the electronic device further comprises:
a third storage memory configured to store a provisioning key unique to the electronic device.

10. The booting system of claim 9, wherein the provisioning key is used as a public key of an encryption technique applied when the secret value is transferred to the electronic device.

11. The booting system of claim 1, wherein the second storage memory is further configured to store a third firmware code, and
wherein the first firmware code, when executed, further causes the at least one processor to generate the third device identifier value based on the second device identifier value and a seventh hash value for the second firmware code and the third firmware code.

12. The booting system of claim 11, wherein the second firmware code and the third firmware code correspond to the same layer.

13. An electronic device, comprising:
at least one processor:
a first storage memory configured to store a secret value set by a host;
a second storage memory configured to store a boot loader code, a first firmware code, and a second firmware code; and
a read-only memory (ROM) configured to store a ROM code executable in a booting operation,
wherein the ROM code, when executed, causes the at least one processor to generate a first device identifier value based on the secret value and a first hash value for the boot loader code,
wherein the boot loader code, when executed, causes the at least one processor to generate a second device identifier value based on the first device identifier value and a second hash value for the first firmware code,
wherein the first firmware code, when executed, causes the at least one processor to generate a third device identifier value based on the second device identifier value and a third hash value for the second firmware code, and
wherein the electronic device is configured to determine whether booting succeeds by sending the third device identifier value to the host and determining that at least one of the boot loader code, the first firmware code, and the second firmware code is falsified based on the third device identifier value being different from a corresponding verification value.

14. The electronic device of claim 13, wherein at least one of the first device identifier value, the second device identifier value, and the third device identifier value is transferred to the host.

15. The electronic device of claim 13, further comprising:
a third storage memory configured to store a provisioning key unique to the electronic device,
wherein the provisioning key is used as a public key of an encryption technique applied when the secret value is transferred to the electronic device.

16. A booting method comprising:
generating, by executing a read-only memory (ROM) code with at least one processor, a first hash value for a boot loader code;
generating, by executing the ROM code with the at least one processor, a first device identifier value using the first hash value and a preset secret value;
generating, by executing the boot loader code with the at least one processor, a second hash value for a first firmware code;
generating, by executing the boot loader code with the at least one processor, a second device identifier value using the second hash value and the first device identifier value;
generating, by executing the first firmware code with the at least one processor, a third hash value for a second firmware code;
generating, by executing the first firmware code with the at least one processor, a third device identifier value using the third hash value and the second device identifier value; and
determining whether booting succeeds by sending at least one of the first device identifier value, the second device identifier value, and the third device identifier value to a host and determining that at least one of the boot loader code, the first firmware code, and the second firmware code is falsified based on the third device identifier value being different from a corresponding verification value.

17. The method of claim 16, further comprising, prior to sending the at least one of the first device identifier value, the second device identifier value, and the third device identifier value to the host:
sending a fourth hash value for the first device identifier value, the second device identifier value, and the third device identifier value to the host.

18. The method of claim 17, further comprising receiving a first nonce value from the host,
wherein the fourth hash value is transferred to the host together with a first hash-based message authentication code (HMAC) value, and
wherein the first HMAC value corresponds to a first output value of an HMAC algorithm which uses the first nonce value, the preset secret value, the fourth hash value as an input.

19. The method of claim 18, further comprising receiving a second nonce value from the host,
wherein the at least one of the first device identifier value, the second device identifier value, and the third device identifier value is transferred to the host together with a second HMAC value, and
wherein the second HMAC value corresponds to second output value of an HMAC algorithm which uses the second nonce value, the preset secret value, the first device identifier value, the second device identifier value, and the third device identifier value as an input.

20. The method of claim 16, further comprising:
receiving the preset secret value from the host through a public key-based encryption algorithm.

* * * * *